(12) United States Patent
Spencer et al.

(10) Patent No.: US 10,518,312 B1
(45) Date of Patent: Dec. 31, 2019

(54) PRODUCTS MANUFACTURED BY AUTOFRETTAGE

(71) Applicant: SPENCER COMPOSITES CORPORATION, Sacramento, CA (US)

(72) Inventors: Brian E. Spencer, Sacramento, CA (US); Richard L. Grover, Whittier, CA (US); Zachary B. Spencer, Sacramento, CA (US)

(73) Assignee: SPENCER COMPOSITES CORPORATION, Sacramento, CA (US)

( * ) Notice: Subject to any disclaimer, the term of this patent is extended or adjusted under 35 U.S.C. 154(b) by 295 days.

(21) Appl. No.: 15/604,347

(22) Filed: May 24, 2017

Related U.S. Application Data

(62) Division of application No. 13/623,259, filed on Sep. 20, 2012, now Pat. No. 9,687,902.

(Continued)

(51) Int. Cl.
*B21D 26/02* (2011.01)
*B32B 15/01* (2006.01)
(Continued)

(52) U.S. Cl.
CPC ......... *B21D 26/033* (2013.01); *B21D 26/041* (2013.01); *B32B 1/00* (2013.01);
(Continued)

(58) Field of Classification Search
CPC .................................................... B21D 26/00
See application file for complete search history.

(56) References Cited

U.S. PATENT DOCUMENTS 3,149,435 A 9/1964 Nordeen
3,438,114 A 4/1969 Berman
(Continued)

FOREIGN PATENT DOCUMENTS

GB 2466641 A 7/2010

OTHER PUBLICATIONS

NASA, "Astronautic Structures Manual, vol. I," NASA Technical Memorandum, X-73305, Mar. 1, 1965, Structures and Propulsion, George C. Marshall Space Flight Center, Alabama, pp. 1-45.
(Continued)

*Primary Examiner* — Humera N Sheikh
*Assistant Examiner* — Xiaobei Wang
(74) *Attorney, Agent, or Firm* — O'Banion & Ritchey LLP; John P. O'Banion

(57) ABSTRACT

A method of incremental autofrettage is taught herein, whereby the cycle life of a metal liner in a pressure vessel is increased. This method serves to increase the yield strength of the metal liner through sequential work hardening due to repeated autofrettage at increasing pressures. By incrementally increasing the internal pressure used in the autofrettage process, the compressive stresses at an inner surface of the metal liner may be controlled so that post-pressurization buckling does not occur, yet the yield strength of the metal liner is substantially increased. The higher compressive stresses in the metal liner mean that higher Maximum Expected Operating Pressures (MEOPs) may be used without detracting from the cycle life of the metal liner, or alternatively, for lower pressures, a longer metal liner cycle life may be obtained. Either internal or external pressures may be used, generated by a pressure source, or a suitable die.

2 Claims, 10 Drawing Sheets

Related U.S. Application Data

(60) Provisional application No. 61/536,719, filed on Sep. 20, 2011.

(51) Int. Cl.
| | | |
|---|---|---|
| *B32B 1/08* | (2006.01) | |
| *B21D 26/033* | (2011.01) | |
| *B21D 26/041* | (2011.01) | |
| *B32B 1/00* | (2006.01) | |
| *B65D 6/00* | (2006.01) | |
| *B21D 26/051* | (2011.01) | |

(52) U.S. Cl.
CPC ............. *B32B 15/01* (2013.01); *B65D 7/12* (2013.01); *B21D 26/051* (2013.01)

(56) References Cited

U.S. PATENT DOCUMENTS

| | | | | |
|---|---|---|---|---|
| 4,571,969 | A * | 2/1986 | Tomita | B23P 9/00 |
| | | | | 29/446 |
| 6,425,172 | B1 * | 7/2002 | Rutz | B29C 70/56 |
| | | | | 156/162 |
| 6,491,182 | B1 | 12/2002 | Holroyd | |
| 6,810,615 | B2 * | 11/2004 | Hermanson | B23P 9/025 |
| | | | | 42/76.1 |
| 7,818,986 | B1 * | 10/2010 | Parker | B23P 9/00 |
| | | | | 29/421.1 |
| 2008/0000065 | A1 | 1/2008 | Ganguly | |
| 2008/0127654 | A1 | 6/2008 | Darling | |
| 2011/0309074 | A1 | 12/2011 | Thunhorst | |
| 2013/0060536 | A1 | 3/2013 | Sukup | |

OTHER PUBLICATIONS

Morris, E.E. et al. "Parametric Study of Glass-Filament-Reinforced Metal Pressure Vessels," Topical Report prepared for NASA CR 54-855, Apr. 1, 1966, pp. 1-385.

Hickey Jr, C.F., "Ferrous Alloys," Aerospace Structural Metals Handbook, Mar. 1973, Code 1303, pp. 1-29.

Dieter, G. E., "Fatigue of Metals," Mechanical Metallurgy, 2nd Ed., New York, McGraw-Hill, Inc., 1976, pp. 411-413.

Conway, et al. "Fatigue, Tensile and Relaxation behavior of Stainless Steels," United States Atomic Energy Commission Report TID-26135, Jun. 1, 1975, pp. 1-279.

Yeager, R. W., et al. "Design Curves for Filament-Wound rocket Motor Cases", Society of Plastics Engineers, Inc., 20th Annual Technical Conference, Atlantic City, New Jersey, Nov. 1, 1963, pp. 1-66.

Stephens, I. S. et al. "Metal Fatigue in Engineering," 2nd Ed., John Wiley & Sons, Inc., 2001, pp. 95-119.

\* cited by examiner

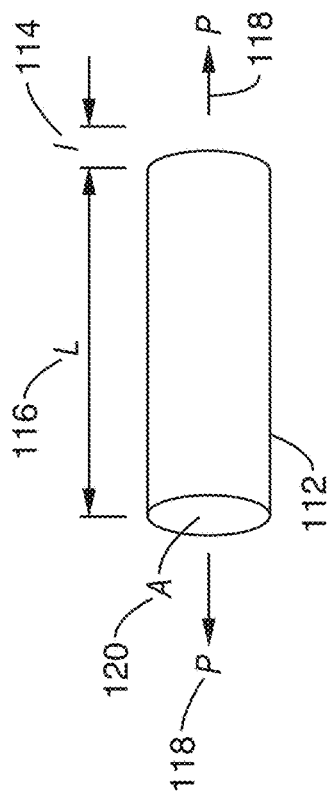
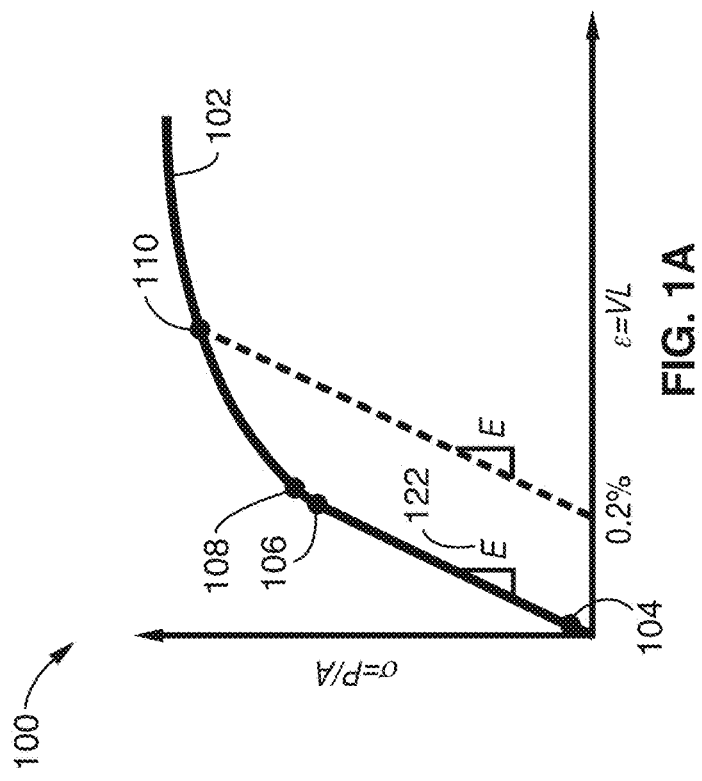

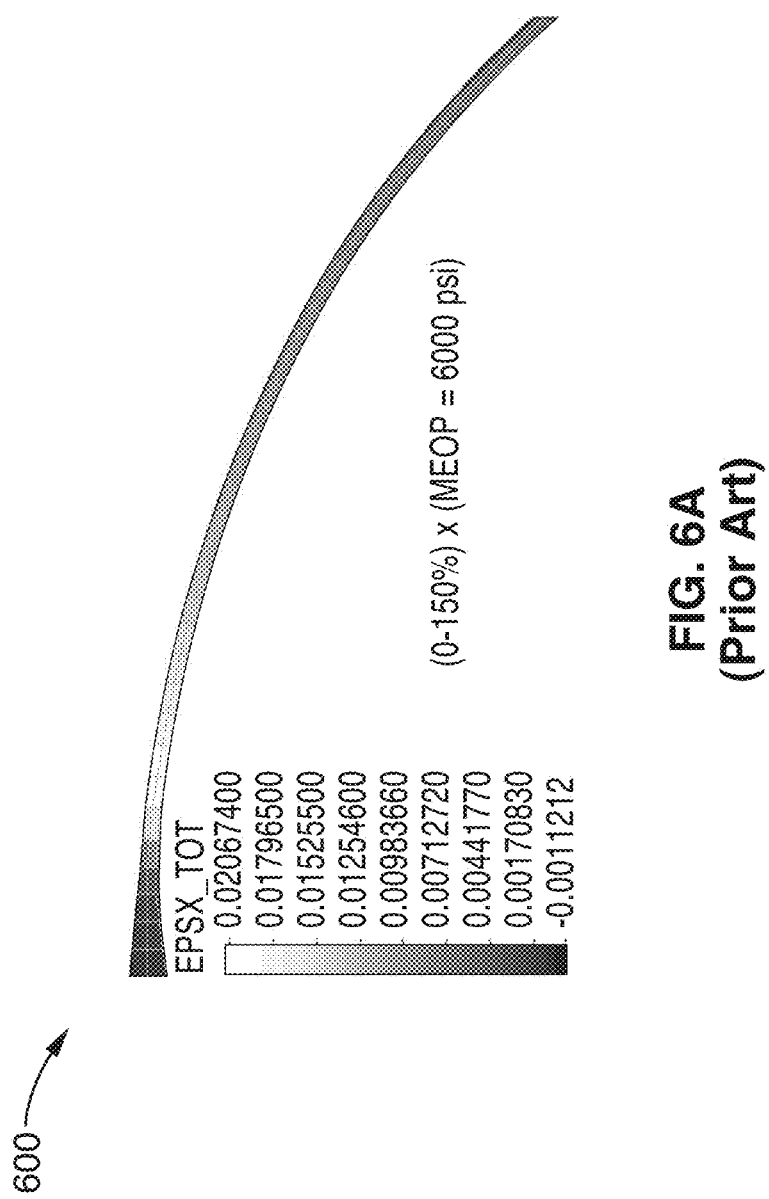

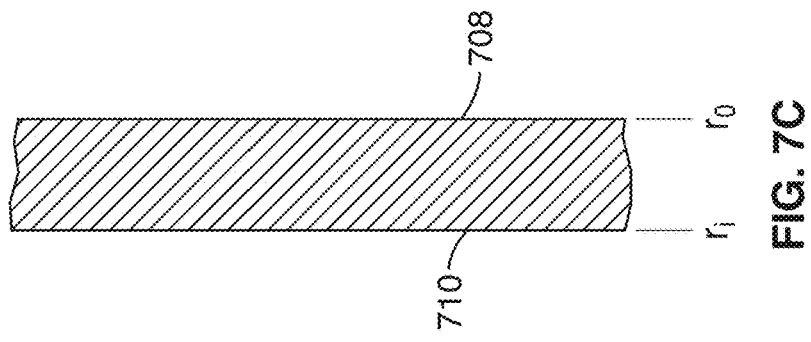
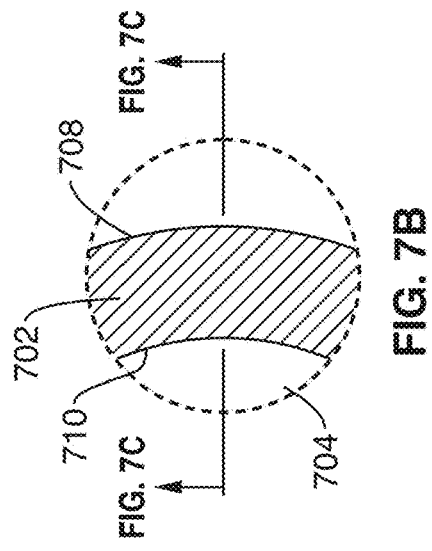
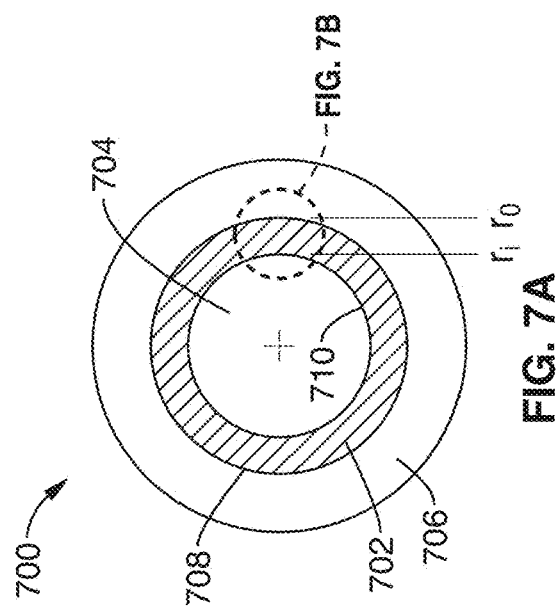

PRODUCTS MANUFACTURED BY AUTOFRETTAGE

CROSS-REFERENCE TO RELATED APPLICATIONS

This application is a division of U.S. patent application Ser. No. 13/623,259 filed on Sep. 20, 2012, incorporated herein by reference in its entirety, which claims priority to, and the benefit of, U.S. provisional patent application Ser. No. 61/536,719 filed on Sep. 20, 2011, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

BACKGROUND OF THE INVENTION

1. Field of the Invention

This invention pertains generally to liners in pressure vessels, more particularly to metal liners with improved pressure cycle life in composite pressure vessels, and still more particularly to metal liners incrementally autofrettaged for improved pressure cycle life in composite pressure vessels.

2. Description of Related Art

Many high performance composite pressure vessels are fabricated with metal liners to provide vessels with higher temperature performance, to contain reactive materials, or to simplify manufacturing. Metal lined composite pressure vessels have been in use for over fifty years.

One of the issues with metal liners relates to their fatigue properties. Pressure cycling of a metal liner eventually leads to metal fatigue, cracking, and failure. Metal lined composite pressure vessels may use a process called autofrettage to improve the metal liner stress profile and corresponding cycle life.

Autofrettage was originally used by the French to extend the life of metal gun barrels by internally pressurizing the barrel beyond the yield strength of the inner portion of the barrel so that it would plastically yield. When depressurized, the yielded material would then equilibrate in a state of partial compression. Generally cracks cannot form or grow if a metal is in compression. Therefore, when the gun is fired, the inner portion of the gun barrel would not reach as high a tensile stress state as it otherwise would have if not autofrettaged, because it began pressurization in a compressive stress state. Therefore, autofrettaged gun barrels lasted longer than untreated gun barrels.

This same autofrettage procedure may be used in metal lined composite pressure vessels to place the liner in compression at ambient (zero gage) pressure. As the vessel is pressurized during use, the liner does not reach the stress state it otherwise would have, had the autofrettage process not been used.

During the initial autofrettage pressurization of a metal lined composite pressure vessel, locally high plastic strains can occur at:

(1) stress concentrations, such as transitions from thin to thick regions;

(2) welds, where the joined materials may have initially different amounts of cold work and the yield strength may be lower or higher than the mating material or the weld itself; or (3) at locally thin areas or defects.

In extreme cases, these local high plastic strain areas will crack during the autofrettage cycle. Alternatively, such areas may buckle during depressurization due to the induced compressive stresses and locally reduced stiffness due to local yielding. In less severe cases, the liner will prematurely fail due to cyclic fatigue at such locations.

The only way previously used to prevent premature failures when using the single cycle autofrettage process was to limit local plastic strains by increasing the composite overwrap thickness profile, or to generally increase liner thickness in such a weak area. However, such additional thickness increases both pressure vessel weight and cost. Changing the liner thickness profile may take significant time and may not be compatible with the manufacturing process or required end product.

BRIEF SUMMARY OF THE INVENTION

An aspect of the invention is a method for treating metal, comprising: providing a metal, the metal possessing an initial yield strength; and incrementally autofrettaging the metal to produce an autofrettaged yield strength; whereby the autofrettaged yield strength is increased over the initial yield strength by a percentage selected from a group of percentages consisting of: ≥10%, ≥20%, ≥30%, ≥40%, and ≥50%.

In the method above, the incrementally autofrettaging may comprise performing two, three, four, five, or more cycles of autofrettage of the metal. A successive cycle of autofrettage is performed by pressurizing an interior volume at least partially enclosed by the metal to a higher internal pressure than a previous cycle of autofrettage, thereby straining the metal.

The interior volume need not be completely contained by the metal, as external components may additionally server to seal the interior volume, allowing pressurization of the interior volume.

Each successive cycle of autofrettage may strain a portion of the metal more than a previous cycle. With sufficient strain, work hardening may occur, thereby increasing the metal yield strength at the location of the strain.

Each cycle of autofrettage may sequentially comprise first pressurizing an interior volume at least partially enclosed by the metal to a prescribed gage pressure; and then subsequently depressurizing the interior volume to substantially zero gage pressure. The prescribed gage pressure may be 6000 psig±2%.

The prescribed pressure of each cycle of autofrettage may be sequentially stepped through: 40% of a Maximum Expected Operating Pressure (MEOP)±10%; 60% of the MEOP±10%; 80% of the MEOP±10%; 100% of the MEOP±10%; 120% of the MEOP±10%; and then 150% of the MEOP±20%.

In the methods above, the MEOP may be selected from a group of pressures consisting of: 200-400 psig, 400-800 psig, 800-1200 psig, 1200-1500 psig, 1500-2000 psig, 2000-3000 psig, 3000-5000 psig, 5000-10000 psig, and 10000 psig and above.

The metal may be at least partially disposed about an enclosed volume, so as to pressurize the enclosed volume to a Maximum Expected Operating Pressure (MEOP), thereby producing one cycle of cycle life for the metal; and thereby improve the number of cycles in the cycle life for the metal at the MEOP by a factor selected from a group of factors consisting of: ≥2×, ≥5×, ≥10×, ≥20×, ≥50×, ≥100×, ≥200×, ≥500×, and ≥800×. The cycle life is the number of cycles from 0 psig to MEOP prior to vessel rupture, or loss of pressure.

The methods above may further comprise: disposing a material about the metal; wherein the material substantially contacts the metal. By substantial contact, it is meant that the material is in contact with the metal over more than 80%, 90%, or 95% of the contact area. Incidental voids of low percentage of contact area do not negate substantial contact.

According to another aspect of the method above the metal at least partially encloses an interior volume, and the material substantially contacts the metal on a side opposite from the interior volume. Basically, this is the case where the material is on the outside of the metal.

In another aspect of the method above, the metal at least partially encloses an interior volume, and the material substantially contacts the metal on the interior volume side. This is the case where the material is in the interior of the metal. Such a situation is ideal when pressurized corrosives are contained, and it is desired to protect the metal from corrosion.

The material above may be selected from a group of materials consisting of: a glass fiber, a carbon fiber, an aramid fiber, a thermoplastic fiber, a reinforced thermoplastic fiber, a matrix of one or more of the preceding fibers in a thermoset or thermoplastic, a thermoset, and a thermoplastic.

The metal above may be selected from one or more of a group of materials consisting of: a metal element, a metal alloy, a layered metal of two or more of the foregoing, a glass fiber, a carbon fiber, an aramid fiber, a thermoplastic fiber, a reinforced thermoplastic fiber, a matrix of one or more of the preceding fibers in a thermoset or thermoplastic, a thermoset, and a thermoplastic.

Another aspect of the invention may be an incrementally autofrettaged product manufactured by a process comprising: providing a product comprising a metal, the metal possessing an initial cycle life when tested at a Maximum Expected Operating Pressure (MEOP); and incrementally autofrettaging the metal; whereby an expected cycle life at the MEOP is improved through the incrementally autofrettaging by a factor selected from a group of factors consisting of: ≥2×, ≥5×, ≥10×, ≥20×, ≥50×, ≥100×, ≥200×, ≥500×, and ≥800×.

Still another aspect of the invention may be an incrementally autofrettaged composite pressure vessel, comprising: a metal liner disposed about an interior volume; and a material that substantially contacts and is disposed about the metal liner; wherein the metal liner has been subjected to two or more cycles of incremental autofrettage.

In another aspect of the incrementally autofrettaged composite pressure vessel above, the metal liner comprises two or more regions of autofrettaged yield strength when compared with the metal liner with an initial yield strength prior to any incremental autofrettage; whereby the autofrettaged yield strength is increased over the initial yield strength by a percentage selected from a group of percentages consisting of: ≥10%, ≥20%, ≥30%, ≥40%, and ≥50%.

In another aspect of the incrementally autofrettaged composite pressure vessel above, a cycle life of the metal liner is increased over the same metal liner having had zero or one cycles of autofrettage when the interior volume is pressurized to a Maximum Expected Operating Pressure (MEOP), thereby producing one cycle of cycle life for the metal liner; whereby the increase in the number of cycles in the cycle life for the metal liner at the MEOP is selected from a group of factors consisting of: ≥2×, ≥5×, ≥10×, ≥20×, ≥50×, ≥100×, ≥200×, ≥500×, and ≥800×.

In yet another aspect of the invention, a method for increasing metal pressure vessel cycle life may comprise: providing a metal pressure vessel with an initially expected cycle life; and subjecting the metal pressure vessel to two or more cycles of autofrettage; whereby for a given Maximum Expected Operating Pressure (MEOP), a calculated cycle life of the metal pressure vessel is increased when compared to the initially expected cycle life without the two or more cycles of autofrettage, by a factor selected from a group of factors consisting of: ≥2×, ≥5×, ≥10×, ≥20×, ≥50×, ≥100×, ≥≥200×, ≥500×, and ≥800×.

Tests have shown improvements from a mere single cycle of life time to 800 successfully completed cycles for the same pressure vessel before and after incremental autofrettage, when cyclically tested at the MEOP.

In still another aspect of the invention, an incrementally autofrettaged metal pressure vessel may comprise: a metal pressure vessel; wherein the metal pressure vessel has two or more regions of autofrettaged yield strength, each of which regions corresponds to a cycle of incremental autofrettage; wherein the autofrettaged yield strength of at least one of the regions is increased over an initial metal pressure vessel yield strength by a percentage selected from a group of percentages consisting of: ≥10%, ≥20%, ≥30%, ≥40%, and ≥50%. The metal pressure vessel may be a pipe.

At least one of the cycles of incremental autofrettage may be produced by a pressure external to the pressure vessel. The pressure external to the pressure vessel may be produced by either an external ambient pressure, or by an external die.

In yet another aspect of the invention, an incrementally autofrettaged metal pipe may comprise: a metal pipe with an initial yield strength; wherein the metal pipe has two or more regions of autofrettaged yield strength, each of which regions corresponds to a cycle of incremental autofrettage; wherein the autofrettaged yield strength of at least one of the regions is increased over the initial yield strength by a percentage selected from a group of percentages consisting of: ≥10%, ≥20%, ≥30%, ≥40%, and ≥50%.

At least one cycle of incremental autofrettage may be produced by a pressure external to the metal pipe. The pressure external to the metal pipe may be produced by either an external ambient pressure, or by an external die.

In still another aspect of the invention, a method of incrementally autofrettaging metal pipe may comprise: providing a metal pipe having an initial yield strength; and applying two or more cycles of incremental autofrettage to the metal pipe; wherein the metal pipe has two or more regions of autofrettaged yield strength, each of which regions corresponds to a cycle of incremental autofrettage; wherein the autofrettaged yield strength of at least one of the regions is increased over the initial yield strength by a percentage selected from a group of percentages consisting of: ≥10%, ≥20%, ≥30%, ≥40%, and ≥50%.

The method above may further comprise providing at least one of the cycles of incremental autofrettage by applying a pressure internal to the metal pipe. The pressure internal to the metal pipe may be produced by either an internal ambient pressure, or by an internal die. At least one of the cycles of incremental autofrettage may be performed by applying a pressure external to the metal pipe. This pressure external to the metal pipe may be produced by either an external ambient pressure, or by an external die.

In yet another aspect of the invention, an incrementally autofrettaged pipe may be produced by a process of incrementally autofrettaging metal pipe, comprising: extruding a metal pipe, the metal pipe possessing an initial yield strength; and applying two or more cycles of incremental autofrettage to the metal pipe to produce an autofrettaged yield strength; whereby the autofrettaged yield strength is increased over the initial yield strength by a percentage selected from a group of percentages consisting of: ≥10%, ≥20%, ≥30%, ≥40%, and ≥50%.

The applying of the two or more cycles of incremental autofrettage may occur substantially contemporaneously with the extruding of the metal pipe. Such substantial contemporaneity may be achieved by continuous extrusion of metal pipe, with subsequent in line dies performing incremental autofrettage.

These dies may be either internal or external to the metal pipe, depending on the application and end use, and properties desired. Both internal and external dies or pressures may be used by themselves, or together to achieve still more material property improvements through the process of incremental autofrettage.

Alternatively, the metal pipe may be made somewhere, or at some time, and then processed by incremental autofrettage hours, days, or years later by applying of the two or more cycles of incremental autofrettage substantially after the extruding of the metal pipe.

In the incrementally autofrettaged pipe above, at least one of the cycles of incremental autofrettage occurs due to a relative passage of the metal pipe and a die. By this relative passage, it is meant that the pipe and die move relative to each other, such that the die deforms the metal pipe. Either the die, or the metal pipe, may be stationary, while the other is moving. The die may be selected from a group of dies consisting of: a die internal to the metal pipe, and a die external to the metal pipe.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1A is a graph of the typical stress strain curve behavior for non-ferrous alloys.

FIG. 1B is a diagram of a cylindrical section placed under test in a stress strain machine.

FIG. 6A is a graph of the FEA modeled strains present in a metal liner dome subjected to only a single autofrettage cycle to 150% of the MEOP, typical of the prior art, indicating extremely high levels of strain in localized areas.

FIG. 7A is a drawing of the cross section of a thick walled composite tube where a thick walled inner liner is made of a metal capable of work hardening with an inner pressurized region.

FIG. 7B is an enlarged view of a section of the thick walled inner liner of FIG. 7A.

FIG. 7C is a vertical cross section of the thick walled inner liner of FIG. 7B.

DETAILED DESCRIPTION OF THE INVENTION

1. Definitions

Figure 2:
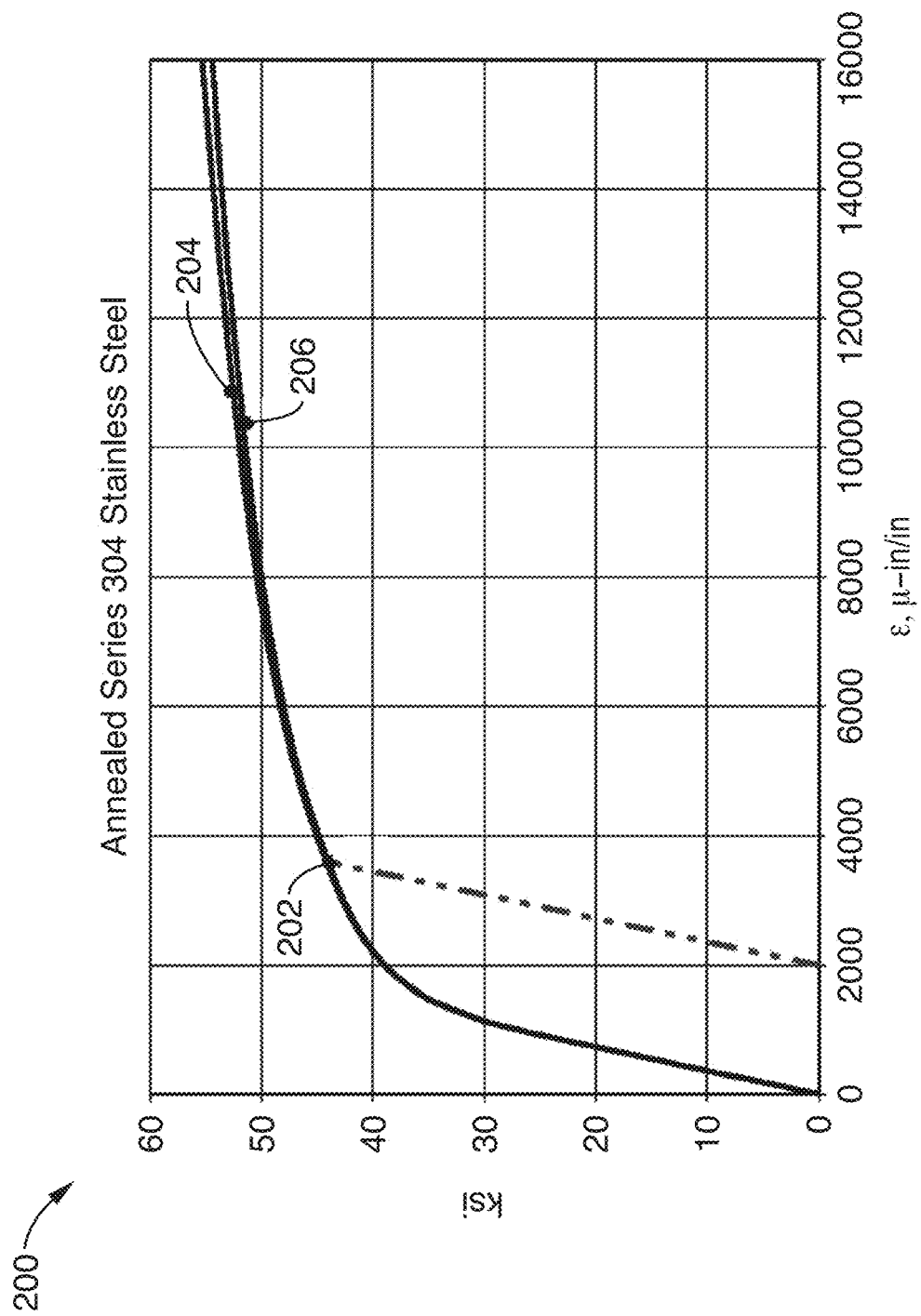
FIG. 2 is a graph of the stress vs. strain behavior of series 304 annealed stainless steel.

The following terms are used herein and are thus defined to assist in understanding the description of the invention(s). Those having skill in the art will understand that these terms are not immutably defined, and that the terms should be interpreted using not only the following definitions but variations thereof as appropriate within the context of the invention(s).

"Autofrettage" means a metal fabrication technique whereby a pressure vessel is subjected to high pressure, causing portions of the vessel to yield. After the high pressure is removed, the yielded and non-yielded portions of the vessel are placed in a stress state different than before the high pressure was applied, which is without limitation generally a compressive residual stress state.

One goal of autofrettage is to increase the durability of a final product. Inducing residual compressive stresses into materials can also increase their resistance to stress corrosion cracking, or non-mechanically-assisted cracking that can occur when a material is placed in a suitable environment in the presence of residual tensile stresses.

The single-cycle autofrettage process is commonly used in manufacturing of high-pressure pump cylinders, battleship and tank cannon barrels, and high-pressure fuel injection systems for diesel engines. The primary mechanism of strengthening in this process is placing the interior material in a simple state of compressive stress.

Initially, a single steel tube is used with an internal bore slightly less than ultimately desired. The tube is subjected to internal pressure of sufficient magnitude so as to enlarge the internal bore. In the process, the inner radius portion (surrounding the inner bore) of the metal tube is stretched beyond its elastic limit. This means that the inner radius portion has now been stretched to a point beyond which the steel is unable to return to its original shape when the internal pressure in the internal bore has been removed, which is beyond the yield point.

Although the outer radial portion of the tube is also stretched, the degree of internal pressure applied during the process is such that the outer portion is generally not stretched beyond its elastic limit. The reason why this is possible is that the stress distribution occurring radially from the inner radius to the outer radius of the tube is non-uniform, particularly for thick walled tubes. A maximum stress value occurs at the inner radius of the tube, in the metal immediately adjacent to the source of pressure, decreasing markedly towards the outer radius of the tube.

At an outer radius portion of the tube, the stress is proportional to the strain applied within the elastic limit. Therefore, the expansion at the outer radius portion is less than at the bore, and remains elastic, while the behavior of the inner portion is plastic. Because the outer radius portion of the tube remains elastic, this portion attempts to return to its original shape; however, the outer radius portion is prevented from doing so completely by the now permanently stretched inner portion. The effect is that the inner portion of the metal is put under compression by the outer region in much the same way as though an outer layer of metal had been press fit upon it.

Analysis of tubular stresses is easily accomplished when certain assumptions are met. A complete analysis of the stress state of a thicker tube is known as the analysis of the thick walled pressure vessel, which is also well known in the science of mechanical engineering stress analysis. Finite element analysis (FEA) may be used to model non-tubular shapes undergoing such an internal pressure loading with or without external loads and with or without composite compositions.

When autofrettage is used for strengthening cannon barrels, the barrel is prebored to a slightly undersized inside diameter, and then a slightly oversized die is pushed through the inside diameter of the barrel. The amount of initial underbore and size of the die are calculated to strain the cannon barrel material past its elastic limit into plastic deformation, sufficiently far that the final strained diameter is the final desired bore. Here, the oversized die serves to develop forces in the interior bore of the barrel, analogous to pressurizing the bore.

The autofrettage technique has been applied to the expansion of tubular components "down hole" in oil and gas wells. The method has been patented by the Norwegian oil service company, READ Expandables Ltd., which uses autofrettage to connect concentric tubular components with sealing and strength properties outlined above.

"Work hardening," also known as strain hardening, means the strengthening of a metal by plastic deformation. This strengthening occurs because of dislocation movement within the crystal structure of the material. Any material with a reasonably high melting point such as metals and alloys can be strengthened in this fashion.

Alloys not generally amenable to heat treatment, including low carbon steel, are often work hardened. Some materials cannot be work hardened at normal ambient temperatures, such as indium; however, others can only be strengthened via work hardening, such as pure copper and aluminum.

Work hardening may be desirable or undesirable depending on the outcome sought. An example of undesirable work hardening would be during machining when initial passes of a cutter (or a cutting edge) inadvertently work hardens a work piece surface, causing damage to the cutter during subsequent cutting passes due to the increased hardness of the work piece surface.

An example of desirable work hardening is where metalworking processes are used to intentionally induce plastic deformation to exact a shape change. These processes are known as cold forging, cold working, or cold forming processes. They are characterized by shaping the work piece at a temperature below its recrystallization temperature, usually at ambient room temperature. Cold forming techniques are usually classified into four major groups: squeezing, bending, drawing, and shearing.

"Typical Stress strain Curve" means a graph of the stress versus strain for an engineering material. There are several important characteristics defined in such a curve, as further described below.

Refer now to FIG. 1A, which is a graph 100 of the typical stress strain curve 102 behavior for a metal without a yield point. Here, 104 is the true elastic limit, 106 is the proportional limit, 108 is the elastic limit, and 110 is the 0.2% strain offset yield stress.

Refer now to FIG. 1B, which is a diagram of a cylinder under test in a stress strain machine, where a cylinder 112 extends a length "l" 114 from an initial length "L" 116 due to a tensile force "P" 118 exerted upon a cross-sectional area of "A" 120.

Refer now to both FIG. 1A and FIG. 1B in the definitions below.

It is often difficult to precisely define yielding due to the wide variety of stress-strain curves exhibited by real materials. In addition, there are several possible ways to define yielding, as described below.

"True Elastic Limit" 104 means the lowest stress at which dislocations move. This definition is rarely used, since dislocations move at very low stresses, and detecting such movement is very difficult.

"Proportionality Limit" 106 means the limit of applied stress at which stress is proportional to strain (according to Hooke's law), so that the stress strain graph is a straight line, and the gradient will be equal to the elastic modulus "E" 122 of the material.

"Elastic Limit (or Yield Strength)" 108 means the stress beyond the elastic limit, whereupon permanent deformation of the material will occur. This point tends to be lowest stress where permanent deformation can be measured.

To test the elastic limit requires a manual load-unload procedure, and the accuracy is critically dependent on equipment and operator skill. For elastomers, such as rubber, the elastic limit is much larger than the proportionality limit. Also, precise strain measurements have shown that plastic strain begins at low stresses.

"Yield Point" (between points 108 and 110) means the region in the stress strain curve where the curve 102 levels off and plastic deformation begins to occur.

"0.2% Offset Yield Point (Proof Stress)" 110 means the stress required to generate a 0.2% strain in the material. When a yield point is not easily defined based on the shape of the stress strain curve this offset yield point is arbitrarily defined. The value for this is commonly set at 0.1 or 0.2% of the strain. The offset value is given as a subscript, e.g., $R_{p0.2}$=310 MPa for the 0.2% offset yield point. High strength steel and aluminum alloys do not exhibit a yield point, so this offset yield point is used instead on these materials.

"Upper Yield Point" and "Lower Yield Point" relate to other material stress strain curves, where some metals, such as mild steel, reach an upper yield point before dropping rapidly to a lower yield point (not illustrated here in the curve of FIG. 1A). The material response is linear up until the upper yield point, but the lower yield point is used in structural engineering as a conservative value. If a metal is only stressed to the upper yield point, and beyond, Lüders bands can develop.

2. Introduction

In accordance with the present invention, incremental autofrettage is employed to reduce high local plastic yielding strain, and increase the local yield strength, thereby increasing liner cycle life. In one embodiment, the mechanisms employed include the following:

A. Incremental autofrettage reduces high local plastic yielding and reduces potential liner thinning. Once liner thinning begins strain concentrations can greatly increase thinning. Liner thinning reduces liner life and can promote liner buckling.

B. The cyclic life of pressure vessel liners can be predicted by the equations shown below. The low cycle fatigue life is predicted by the Coffin-Manson law that uses the plastic strain range to predict low cycle fatigue life. The Basquin equation is used to predict high cycle fatigue life.

The strain-life S/N curve for many steels can be characterized by the sum of the Basquin high cycle fatigue equation and the Coffin-Manson low cycle fatigue equation:

$$\varepsilon_t = \varepsilon_e + \varepsilon_p = (\sigma_f'/E)(2N_f)^b + (\varepsilon_f')(2N_f)^c$$

where $\varepsilon_t$=Total elastic strain. The Basquin equation is:

$$\varepsilon_e = (\sigma_f'/E)(2N_f)^b$$

where $\varepsilon_e$=Elastic component of cyclic strain amplitude (R=-1), $\sigma_f'$=Fatigue strength coefficient, E=Young's modulus, $N_f$=Number of cycles to failure, and b=Fatigue strength exponent (for most metals −0.12<b<−0.05). The Coffin Manson equation is:

$$\varepsilon_p = (\varepsilon_f')(2N_f)^c$$

where $\varepsilon_p$=Plastic component of cyclic strain amplitude (R=-1), $\varepsilon_f'$=Fatigue ductility coefficient, $N_f$=Number of cycles to failure, and c=Fatigue ductility exponent (for most metals −0.7<c<−0.5).

3. Isotropic And Kinematic Work Hardening

The incremental autofrettage process is used here along with a process of work hardening to improve the cyclic fatigue life of metal liners. Work hardening occurs when the yield stress of a metal increases as it plastically deforms.

Refer now to FIG. 2, which is a graph 200 of the stress vs. strain behavior of annealed series 304 stainless steel. With no work hardening, the slope of the stress strain curve would be horizontal once the yield stress of the material was reached, and no additional load would be required to increase strain. However, FIG. 2 shows that work hardening does occur in the plastic region of the stress strain curve for 304 series stainless steels, both before and after the 0.2% offset yield stress limit 202 of about 43.5 ksi.

On graph 200, both the true stress strain curve 204 and the engineering stress strain curve 206 are shown.

Figure 3:
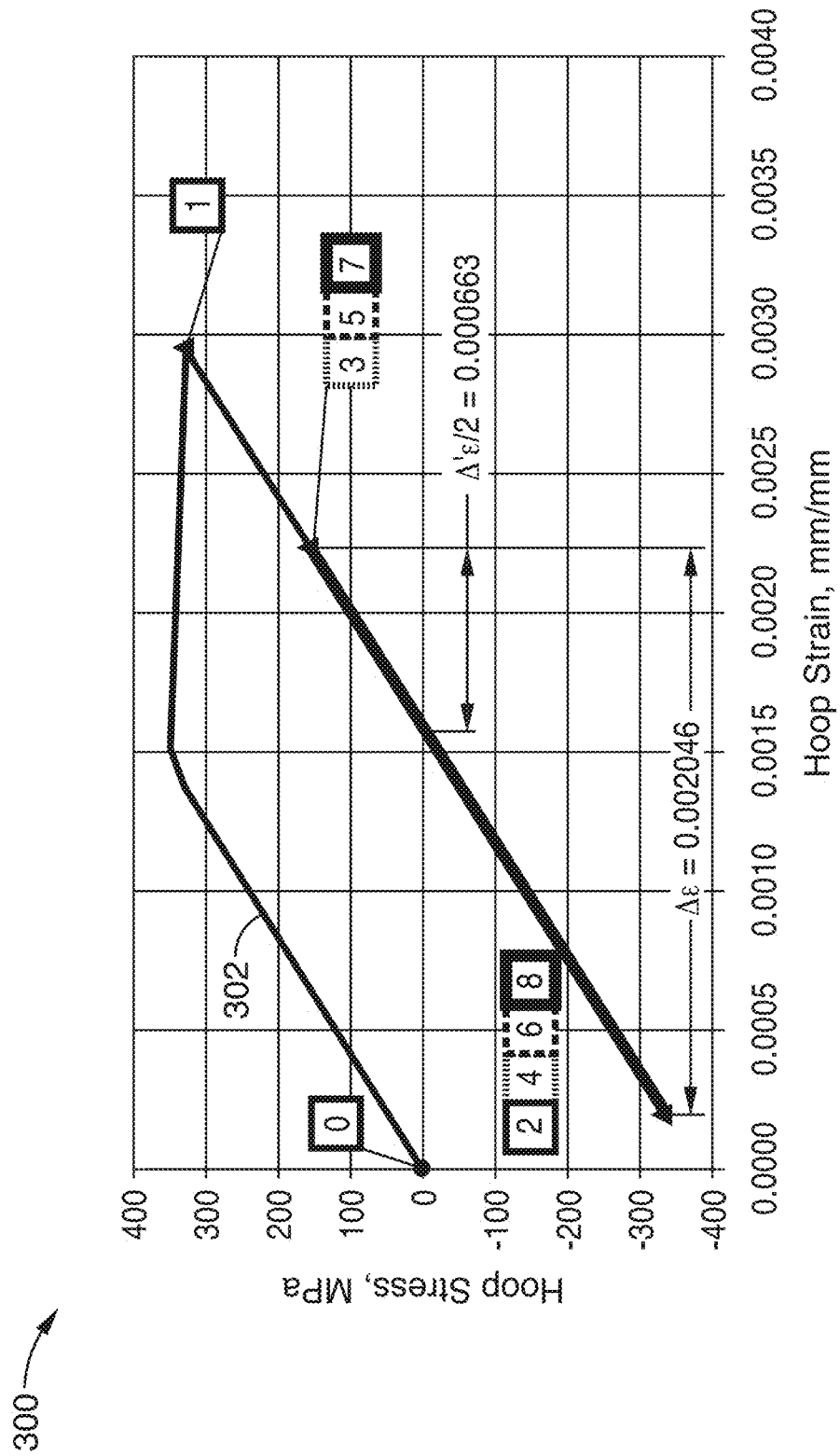
FIG. 3 is a graph of the hoop stress vs. hoop strain curve in a cylindrical liner portion of a pressure vessel undergoing a sequence of pressurization and depressurization as shown in Table 1, showing that no work hardening is occurring.

Refer now to FIG. 3, which is a graph 300 of the hoop stress vs. hoop strain curve 302 of a cylindrical liner portion of a pressure vessel undergoing a sequence of pressurization and depressurization as shown in Table 1. A pressure vessel is designed to operate in a stress range defined by a Maximum Expected Operating Pressure (MEOP). In this design, the MEOP is 2988 psi gage (psig).

Gage pressure is simply the pressure read relative to its surroundings: e.g. a tire pressure is a gage pressure, since a 30 psi tire at standard temperature and pressure at sea level would also experience 14.7 psi of atmospheric pressure, for a 30 psi gage (psig), or 44.7 psi of absolute pressure (relative to a vacuum).

FIG. 3 and Table 1 show the stress strain behavior of a metal liner in a metal lined composite pressure vessel that operates in the elastic range after autofrettage has been accomplished. Table 1 indicates a single autofrettage cycle to a pressure of 1.35×MEOP, followed by three cycles to the MEOP. Note that on successive pressure cycles the stress strain curve follows the same line. The ambient pressure state for the liner is compressive. If autofrettage had not been performed, then the operating cycle would have included plastic yielding, thereby greatly reducing the cycle fatigue life.

In graph 300, the various states 0 to 8 correspond to entry lines 0 to 8 in Table 1.

It is believed that all producers of metal lined composite pressure vessels use a single pressure cycle to accomplish autofrettage. This produces plastic yielding and thinning of the liner, and places the liner in compression at ambient conditions.

However, if the autofrettage is accomplished by pressurizing the vessel with small incrementally increasing pressures above the service pressure MEOP, then the liner can be isotropically hardened (as long as the correct metal alloy has been chosen) with a reduced amount of plastic yielding and reduced thinning of the liner. This significantly improves the liner cyclic fatigue life. The yield surface in the metal liner increases with each successive pressure cycle until it stabilizes after 10 to 100 cycles.

Figure 4:
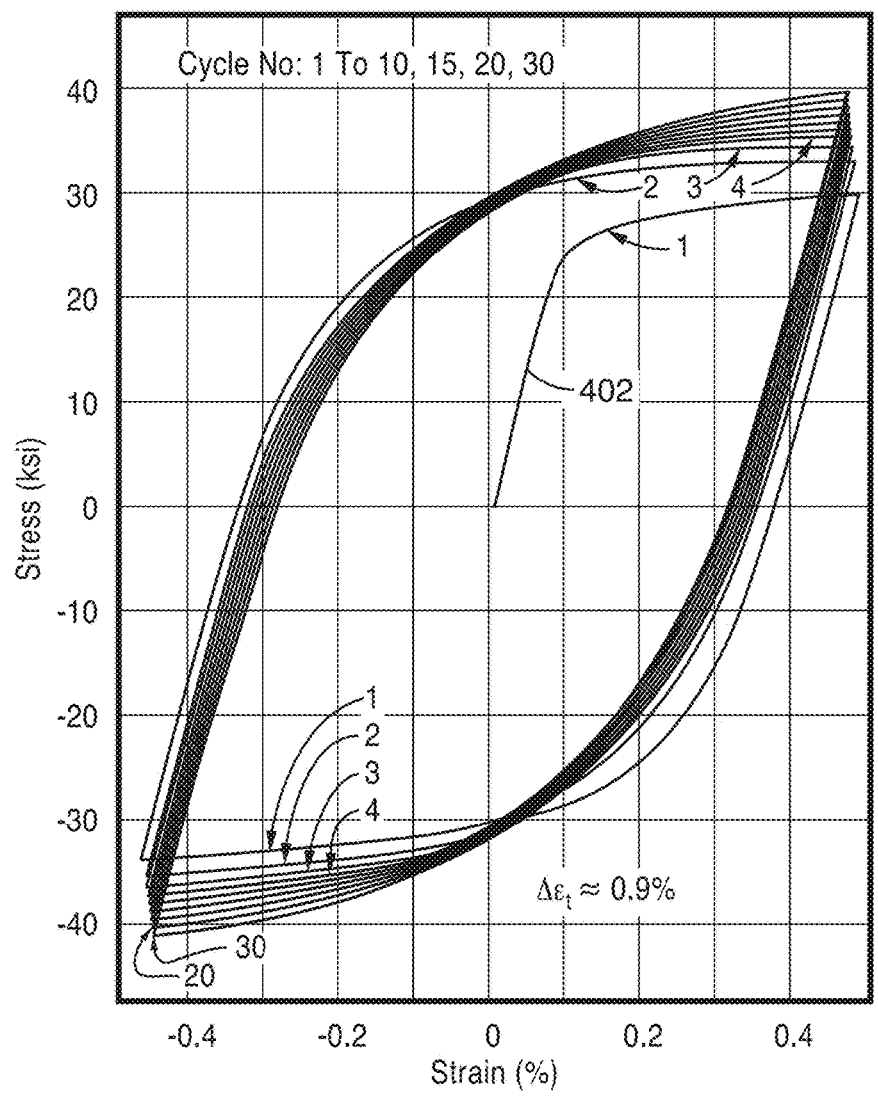
FIG. 4 is a graph of the stress vs. strain curve of the cyclic hardening of annealed series 304 stainless steel corresponding to the state conditions 0-13 shown in Table 2, where isotropic hardening is shown.

Refer now to FIG. 4, which is a graph 400 of the stress vs. strain curve 402 of the cyclic hardening of series 304 stainless steel. The cyclic stress range corresponding to ±0.45% strain increases: 12% after one cycle; a total of 20% after 4 cycles; and 33% after 30 cycles. This produces a larger linear stress range for the liner. Low cycle life (<4000 cycles) for the liner is related to the plastic strain range to which the liner is exposed.

An explanation of the Coffin-Mason cycle life curve was described above. If a longer cycle life is required, the liner must be designed to operate in the elastic range. The incremental autofrettage method shown here produces an increase in the linear elastic range and extends the cycle life of a given design at critical locations without any design changes.

The incremental autofrettage process is particularly applicable to the beneficial hardening of areas of high stress concentration. The incremental autofrettage pressure can be specified with gradually increasing pressure so that stress concentration regions yield and harden while adjacent material remains elastic and unhardened. This process, when performed correctly, tends to distribute an initial high stress concentration location across a large volume of material, which, in effect, decreases the stress concentration.

If the material has a capacity for a significant degree of isotropic hardening, the elastic range of the yielded material will be greater than an unyielded material. Consequently, on subsequent pressure cycles, the adjacent material will begin to yield before the previously yielded material. This causes the yield zone to expand over a larger region and limit the plastic strain in the stress concentration to a lower magnitude than for a single autofrettage cycle.

In other words, the incremental autofrettage method is capable of creating a controlled series of yielded regions. In the case of a thick walled composite pressure vessel, such a sequence of incremental autofrettage treatments may achieve a series of yielded, hardened, metal within a liner that would have been impossible to achieve through a single cycle of autofrettage due to buckling generated from excessive compressive stresses. Such a liner may be characterized by a series of repeated regions of higher strength tapering toward a lower strength region.

Figure 5A:
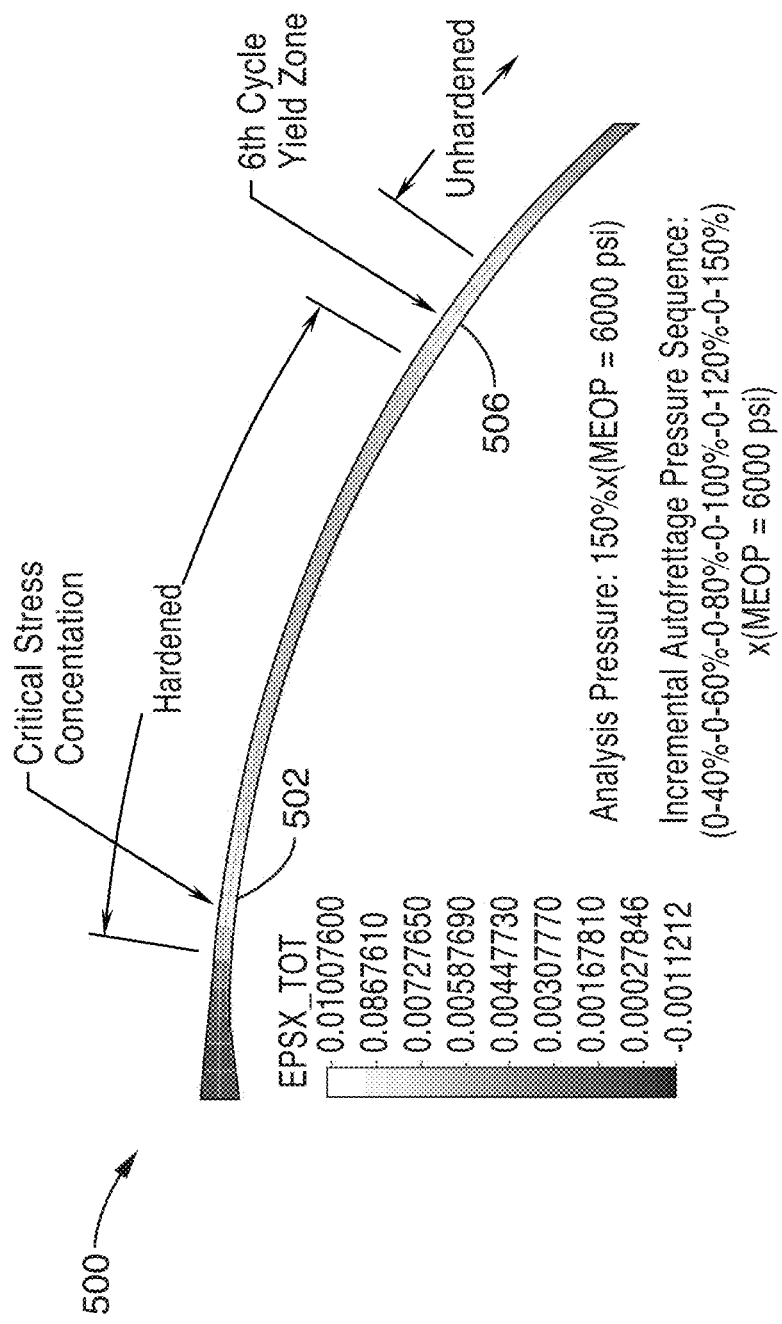
FIG. 5A is a graph of the finite element analysis (FEA) modeled strains present in a metal liner dome as the result of the incremental autofrettage process to a maximum of 150% of the Maximum Expected Operating Pressure (MEOP).
Figure 5B:
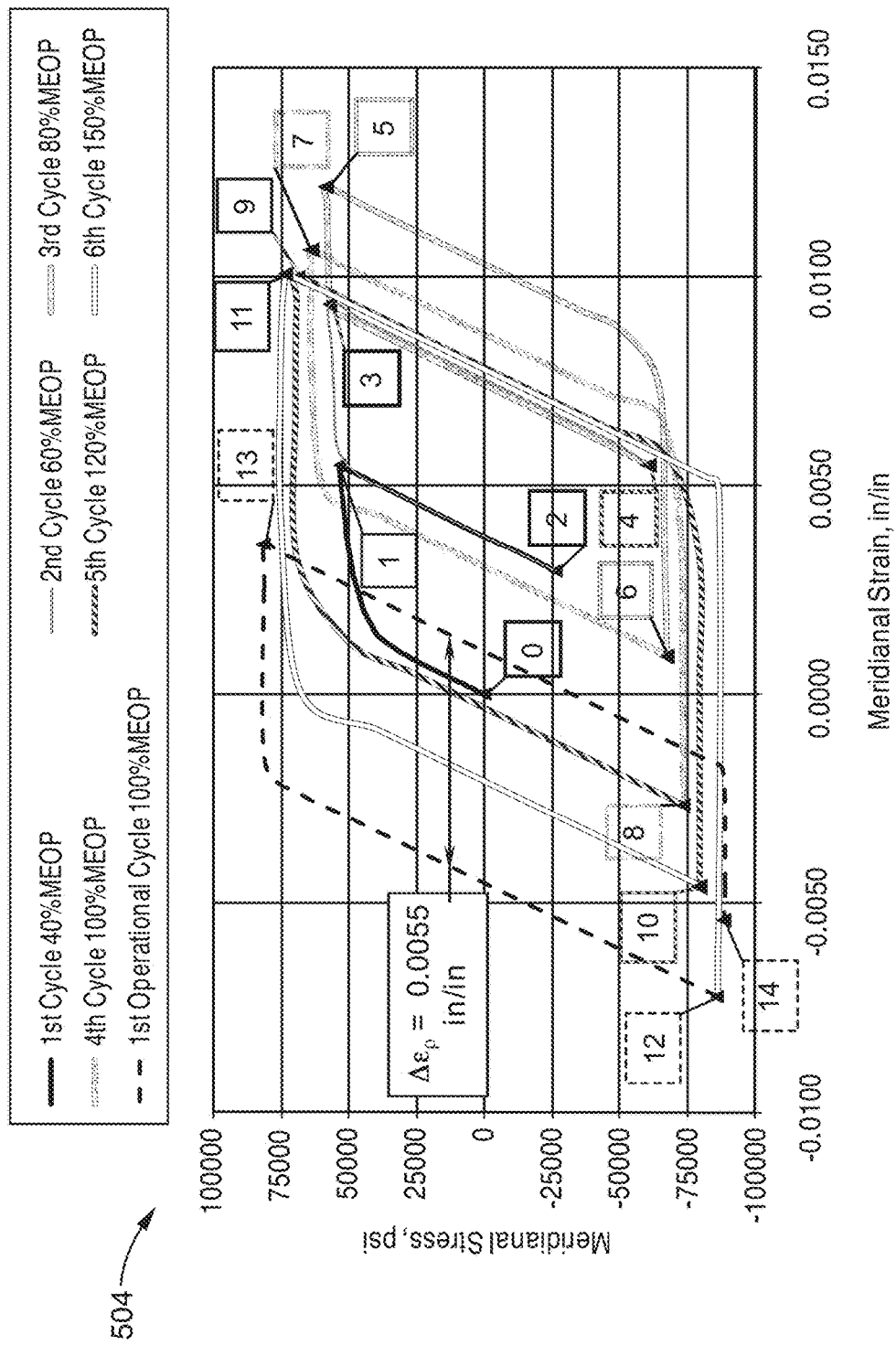
FIG. 5B is a graph of the FEA modeled meridianal stress and strain in the cylinder section of the metal liner of FIG. 5A as a result of performing the incremental autofrettage cycles of Table 2.

Refer now to FIG. 5A and FIG. 5B. Here, FIG. 5A shows the total strain distribution 500 in the metal lined composite pressure vessel dome for state condition 11 shown in Table 2. There is a critical stress concentration 502, which represents a region of maximum stress in the overall pressure vessel.

FIG. 5B is a graph 504 showing the hysteresis loops at the critical stress concentration location 502 shown in FIG. 5A, for the incremental autofrettage state conditions 0-14 shown in Table 2. Note in FIG. 5B that after the first two pressure cycles, the elastic stress range in the liner increases, both in compression (negative stress values and tension (positive stress values). This is called isotropic hardening.

In isotropic hardening, the yield surface expands isotropically in size due to plastic yielding. In kinematic hardening the yield surface is unchanging in shape but can move in space due to plastic yielding. Isotropic and kinematic hardening are the two common descriptions of metal work hardening. Hardening theories can be a combination of the two hardening rules. For cycles one and two in FIG. 5B, where only tensile yielding occurs, there is no difference in the two rules.

Notice in FIG. 5B that the maximum total tensile strain at the critical stress concentration location 502 shown in FIG. 5A is about 1.2% for the third cycle (state condition 5) and decreases for subsequent more highly loaded cycles. This phenomenon is a result of the local hardening of the plastically strained material. On each subsequent cycle, the hardened material yields at a higher stress, so the adjacent unhardened material yields first at a lower stress. FIG. 5A shows a large hardened region has developed after the sixth cycle 506 and a high strain at the boundary between the hardened and unhardened regions.

Figure 6B:
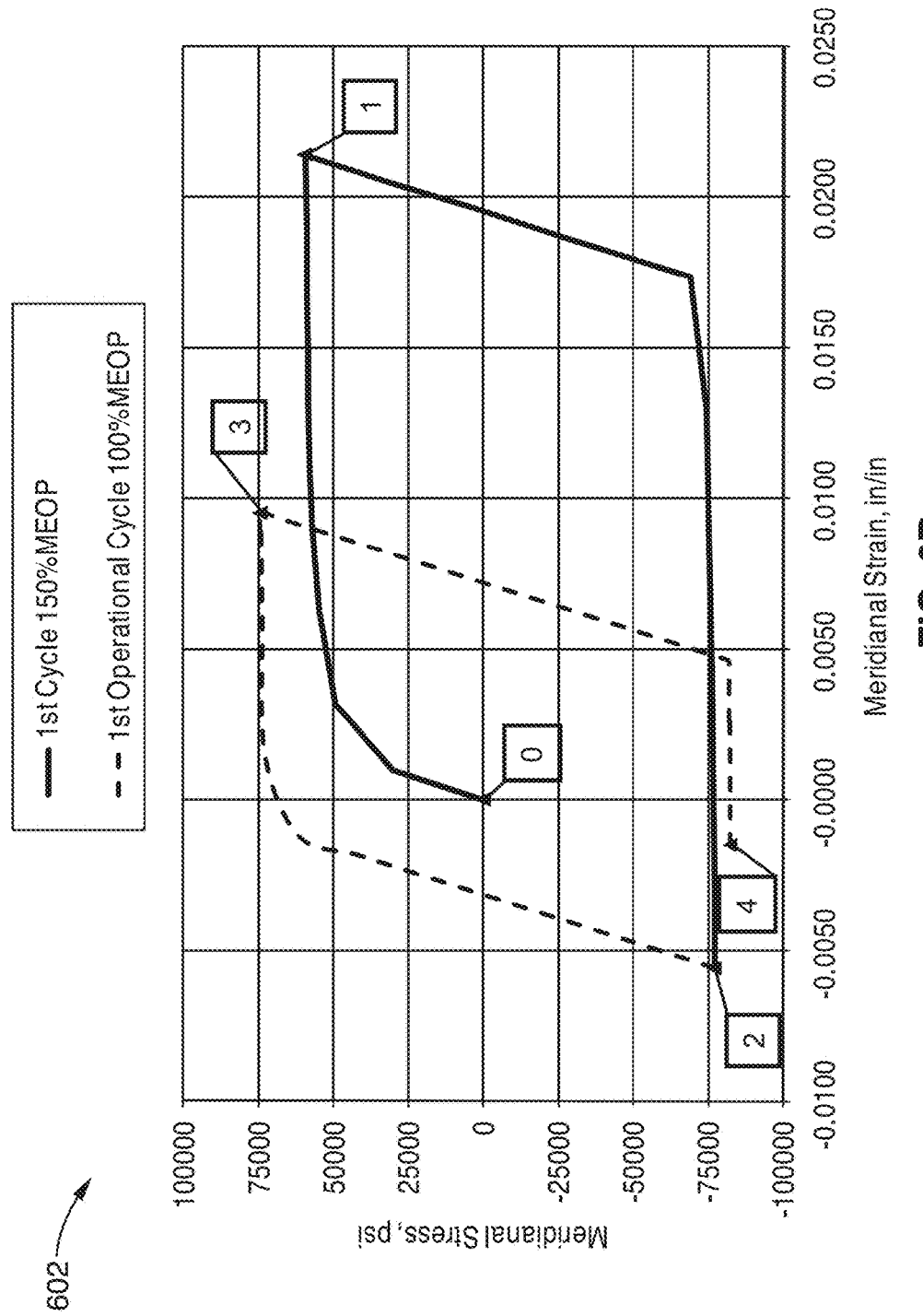
FIG. 6B is a graph of the FEA modeled stress and strain in the cylinder section of a metal liner of FIG. 6A as a result of the prior art single autofrettage cycle of Table 3.

Refer now to FIG. 6A and FIG. 6B. FIG. 6A corresponds to a FEA output 600 of the pressure vessel of FIG. 5A subjected to a prior art single cycle autofrettage as described in Table 3, for the same metal lined pressure vessel and maximum pressure (150% MEOP) used in FIG. 5A. Similarly, FIG. 6B is the single cycle autofrettage stress strain curve 602 that compares to the incremental autofrettage cycle of FIG. 5B.

By comparing FIG. 5B and FIG. 6B, it is seen that the maximum total strain at the stress concentration was reduced from: 2.0674% for the single cycle autofrettage process of FIG. 6B, to 1.00% strain for the incremental autofrettage process of FIG. 5B. So, the strain state and hardening state in the liner is beneficially altered by the incremental autofrettage process, leading to increased cycle life and improved buckling resistance.

The incremental autofrettage process also increased the liner buckling resistance. Liner buckling resistance is severely reduced by liner yielding. The pressure vessel analyzed in FIG. 5A, FIG. 5B, FIG. 6A and FIG. 6B was built and subjected to the single cycle autofrettage sequence in Table 3. This liner buckled at the critical stress concentration location after decompression from the maximum cyclic pressure (150% MEOP).

An identical pressure vessel was built and subjected to the incremental autofrettage pressure sequence in Table 2. This liner survived without buckling when decompressed from the maximum cyclic pressure (150% MEOP).

Example 1

Finite element analysis (FEA) methods were used to verify the expected plastic strain reduction. The example used for evaluation showed a 50% reduction in plastic strain: e.g. from 2.0674% strain to 1.00% strain.

This metal lined pressure vessel was built and tested to prove the FEA results and increased cycle fatigue life.

Example 2

The incremental autofrettage process is first modeled using finite element analysis methods to determine the correct pressures to use without buckling or damaging the metal liner. The yield zone in the metal liner is gradually increased with each higher pressure cycle. This can be evaluated with finite element analysis. FIG. 5B shows the gradually increasing yield zone with each incremental pressure cycle.

Example 3

The maximum expected operating pressure (MEOP) of the pressure vessel used here is 6,000 psig. One set of incremental autofrettage pressure cycles would be:

(0-40%-0-60%-0-80%-0-100%-0-120%-0-150%-0)× (6,000 psig).

Refer now to FIG. 7A through FIG. 7C, which illustrate incremental autofrettage across a cross section of a thick walled composite tube. Here, in FIG. 7A is a cross section 700 of a thick walled composite tube where a thick walled inner liner 702 is made of a metal capable of work hardening surrounding an inner pressurized region 704. A composite outer section 706 surrounds and contacts the thick walled inner liner 702 at its outer radius $r_o$ 708. The interior radius $r_i$ 710 of the thick walled inner liner 702 surrounds the inner pressurized region 704.

FIG. 7B is an enlarged view of a section of the thick walled inner liner 702 of FIG. 7A.

FIG. 7C is a portion of a vertical cross section of the thick walled inner liner of FIG. 7B.

Figure 7D:
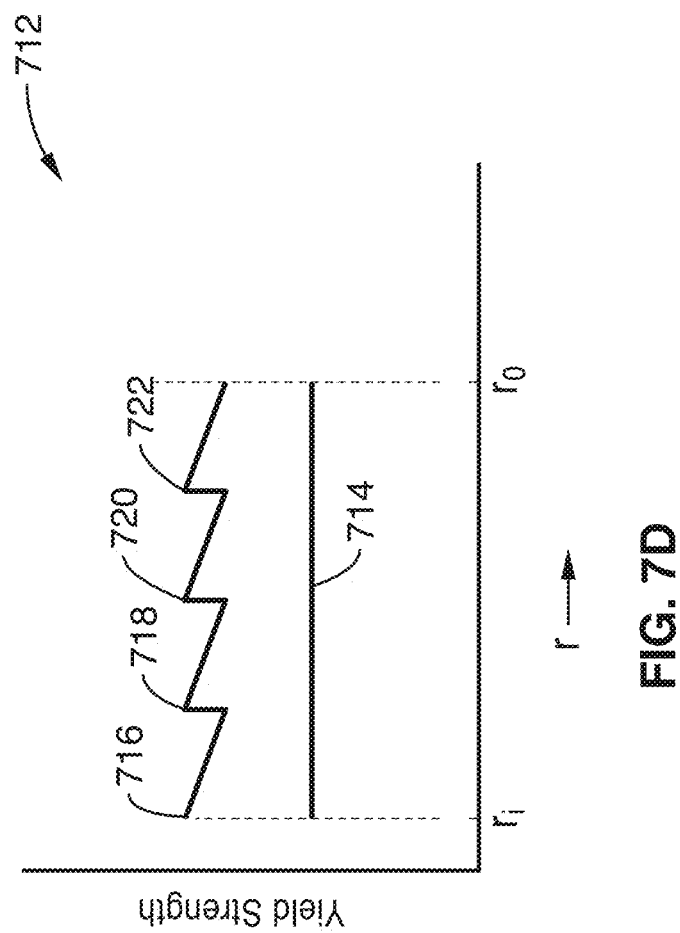
FIG. 7D is a graph of proposed material properties across a radial section of the thick walled inner liner shown in FIG. 7C.

FIG. 7D is a hypothetical graph 712 of proposed material properties across a radial section of the thick walled inner liner 702 shown in FIG. 7C. Here, the yield strengths of the unprocessed thick walled inner liner (702) are shown by curve 714 proceeding from the inner radius $r_i$ to the outer radius $r_o$. It is seen by curve 714 that the bulk material is initially assumed as an annealed, uniform yield stress. However, after four cycles of incremental autofrettage, higher yield strength would likely be observed proceeding radially from the inner radius $r_i$ to the outer radius $r_o$ with peaks 716, 718, 720, and 722 corresponding to four different levels of incremental autofrettage based upon higher autofrettage pressures produced in the inner pressurized region 704.

Example 4

(Autofrettage of Thick-Wall Metal Tube or Metal Pressure Vessel)

Incremental autofrettage can be accomplished by applying an external pressure while internally pressure cycling the metal pipe or pressure vessel internal volume. The external pressure serves the same purpose as a composite overwrap, where the external pressure applies a compressive force on the metal to force the tension yielded inner portion of the wall into compressive yield once the autofrettage internal pressure is removed on each pressure cycle. In one embodiment, the external pressure would not be released until all the Autofrettage pressure cycles were completed.

The external pressure would be selected to produce a stress in the metal below the compressive yield stress and may need to be increased as the compressive yield stress increases due to isotropic hardening. For cylindrical geometries, the external pressure may be estimated by:

$$P=\sigma t/r,$$

where P=external pressure, σ=yield strength of metal, t=wall thickness of metal, and r=radius of metal tube or pressure vessel.

Finite element analysis methods would be used to determine the optimum pressures and number of pressure cycles.

The same incremental autofrettage result could be obtained for piping by drawing the pipe through a series of internal and external dies that produce the same resulting pressure on the inside and outside surface of the pipe in series. This drawing operation would alternately yield the pipe in tension and compression through the wall at each change in die size. The result would be a pipe that has higher tensile and compressive yield strengths and improved fatigue resistance due to a portion of the inner tube wall being in compression at zero gage pressure. During operation of the pipe the tensile stress level would be less than a similar pipe that had not been through the incremental autofrettage process.

4. Conclusion

It will be appreciated that the autofrettage process is an established manufacturing technique used in the fabrication of composite pressure vessels using metallic inner liners. The metal liner is susceptible to fatigue cracking and failure due to repetitive pressure cycles. The more the liner stretches, and in some cases yields due to these pressure cycles, the fewer cycles the liner can withstand. When a metal lined pressure vessel is properly exposed to the incremental autofrettage process, the liner ends up in compressive stress at ambient pressure. Liner life is increased if the stress state of the liner can be reduced or even kept in compression during the operating pressure cycles of the vessel. The incremental autofrettage process consists of pressurizing the vessel to a point where the liner yields. After the vessel is depressurized the liner is in a state of compressive stress. This process lowers the stress state of the liner during operation, therefore extending the number of cycles the liner can withstand before failure.

The optimum metal lined pressure vessel will have a very thin metal liner. However, the current state of the art design and fabrication methods show that a minimum thickness liner is not possible since the liner would buckle on depressurization from the autofrettage cycle. The new incremental autofrettage process disclosed here uses sequential work hardenings of the metal to incrementally increase the autofrettage pressure to allow the liner to work harden on each cycle (thereby increasing the liner tensile strength). This incremental autofrettage method thereby prevents buckling of a thin liner. This process allows use of very thin liners which could not otherwise currently be used. This incremental autofrettage process also allows higher ultimate autofrettage pressures to be reached, which leads to higher compression in the metal liner. On aircraft and space applications reducing weight is important. The thin liner can save significant weight on a large pressure vessel.

By using externally applied pressures in the incremental autofrettage process, materials may be fabricated that are useful in deep sea applications. For instance, pressures at the bottom of the Mariana Trench may reach or exceed 1,086 bars (15,750 psi), sufficient to cut through weak steel or aluminum, or even stronger steels and aluminum alloys with stress concentrations. By suitably processing materials with the incremental autofrettage, materials may be successfully used in such extreme conditions with a greater cycle life, or greater margin of safety.

From the discussion herein it will be appreciated that the invention can be embodied in various ways, including the following:

1. A method for treating metal, comprising: providing a metal, the metal possessing an initial yield strength; and incrementally autofrettaging the metal to produce an autofrettaged yield strength; whereby the autofrettaged yield strength is increased over the initial yield strength by a percentage selected from a group of percentages consisting of: ≥10%, ≥20%, ≥30%, ≥40%, and ≥50%.

2. The method of embodiment 1, wherein the incrementally autofrettaging comprises performing two or more cycles of autofrettage of the metal.

3. The method of embodiment 1, wherein the incrementally autofrettaging comprises performing three or more cycles of autofrettage of the metal.

4. The method of embodiment 1, wherein the incrementally autofrettaging comprises performing four or more cycles of autofrettage of the metal.

5. The method of embodiment 1, wherein the incrementally autofrettaging comprises performing five or more cycles of autofrettage of the metal.

6. The method of embodiment 2, wherein a successive cycle of autofrettage is performed by pressurizing an interior volume at least partially enclosed by the metal to a higher internal pressure than a previous cycle of autofrettage, thereby straining the metal.

7. The method of embodiment 2, wherein each successive cycle of autofrettage strains a portion of the metal more than a previous cycle.

8. The method of embodiment 2, wherein each cycle of autofrettage sequentially comprises: first pressurizing an interior volume at least partially enclosed by the metal to a prescribed gage pressure; and then subsequently depressurizing the interior volume to substantially zero gage pressure.

9. The method of embodiment 8, wherein the prescribed gage pressure is 6000 psig±2%.

10. The method of embodiment 8, wherein the prescribed pressure of each cycle of autofrettage is sequentially stepped through: 40% of a Maximum Expected Operating Pressure (MEOP)±10%; 60% of the MEOP±10%; 80% of the MEOP±10%; 100% of the MEOP±10%; 120% of the MEOP±10%; and then 150% of the MEOP±20%.

11. The method of embodiment 10, wherein the MEOP is selected from a group of pressures consisting of: 200-400 psig, 400-800 psig, 800-1200 psig, 1200-1500 psig, 1500-2000 psig, 2000-3000 psig, 3000-5000 psig, 5000-10000 psig, and 10000 psig and above.

12. The method of embodiment 2, wherein the metal is at least partially disposed about an enclosed volume and further comprising: pressurizing the enclosed volume to a Maximum Expected Operating Pressure (MEOP), thereby producing one cycle of cycle life for the metal; and improving the number of cycles in the cycle life for the metal at the MEOP by a factor selected from a group of factors consisting of: ≥2×, ≥5×, ≥10×, ≥20×, ≥50×, ≥100×, ≥200×, 500×, and 800×.

13. The method of embodiment 1, further comprising: disposing a material about the metal; wherein the material substantially contacts the metal.

14. The method of embodiment 13: wherein the metal at least partially encloses an interior volume; and wherein the material substantially contacts the metal on a side opposite from the interior volume.

15. The method of embodiment 13: wherein the metal at least partially encloses an interior volume; and wherein the material substantially contacts the metal on the interior volume side.

16. The method of embodiment 13, wherein the material is selected from a group of materials consisting of: a glass fiber, a carbon fiber, an aramid fiber, a thermoplastic fiber, a reinforced thermoplastic fiber, a matrix of one or more of the preceding fibers in a thermoset or thermoplastic, a thermoset, and a thermoplastic.

17. The method of embodiment 1, wherein the metal is selected from one or more of a group of materials consisting of: a metal element, a metal alloy, a layered metal of two or more of the foregoing, a glass fiber, a carbon fiber, an aramid fiber, a thermoplastic fiber, a reinforced thermoplastic fiber, a matrix of one or more of the preceding fibers in a thermoset or thermoplastic, a thermoset, and a thermoplastic.

18. An incrementally autofrettaged product manufactured by a process comprising: providing a product comprising a metal, the metal possessing an initial cycle life when tested at a Maximum Expected Operating Pressure (MEOP); and incrementally autofrettaging the metal; whereby an expected cycle life at the MEOP is improved through the incrementally autofrettaging by a factor selected from a group of factors: ≥2×, ≥5×, ≥10×, ≥20×, ≥50×, ≥100×, ≥200×, ≥500×, and ≥800×.

19. An incrementally autofrettaged composite pressure vessel, comprising: a metal liner disposed about an interior volume; and a material that substantially contacts and is disposed about the metal liner; wherein the metal liner has been subjected to two or more cycles of incremental autofrettage.

20. The incrementally autofrettaged composite pressure vessel of embodiment 19: wherein the metal liner comprises two or more regions of autofrettaged yield strength when compared with the metal liner with an initial yield strength prior to any incremental autofrettage; whereby the autofrettaged yield strength is increased over the initial yield strength by a percentage selected from a group of percentages consisting of: ≥10%, ≥20%, ≥30%, ≥40%, and ≥50%.

21. The incrementally autofrettaged composite pressure vessel of embodiment 19: wherein a cycle life of the metal liner is increased over the same metal liner having had zero or one cycles of autofrettage when the interior volume is pressurized to a Maximum Expected Operating Pressure (MEOP), thereby producing one cycle of cycle life for the metal liner; and whereby the increase in the number of cycles in the cycle life for the metal liner at the MEOP is selected from a group of factors: ≥2×, ≥5×, ≥10×, ≥20×, ≥50×, ≥100×, ≥200×, ≥500×, and ≥800×.

22. A method for increasing metal pressure vessel cycle life, comprising: providing a metal pressure vessel with an initially expected cycle life; and subjecting the metal pressure vessel to two or more cycles of autofrettage; whereby for a given Maximum Expected Operating Pressure (MEOP), a calculated cycle life of the metal pressure vessel is increased when compared to the initially expected cycle life without the two or more cycles of autofrettage, by a factor selected from a group of factors consisting of: ≥2×, ≥5×, ≥10×, ≥20×, ≥50×, ≥100×, ≥200×, ≥500×, and ≥800×.

23. An incrementally autofrettaged metal pressure vessel, comprising: a metal pressure vessel; wherein the metal pressure vessel has two or more regions of autofrettaged yield strength, each of which regions corresponds to a cycle of incremental autofrettage; wherein the autofrettaged yield strength of at least one of the regions is increased over an initial metal pressure vessel yield strength by a percentage selected from a group of percentages consisting of: ≥10%, ≥20%, ≥30%, ≥40%, and ≥50%.

24. The incrementally autofrettaged metal pressure vessel of embodiment 23, wherein the metal pressure vessel is a pipe.

25. The incrementally autofrettaged metal pressure vessel of embodiment 23, wherein at least one of the cycles of incremental autofrettage is produced by a pressure external to the pressure vessel.

26. The incrementally autofrettaged metal pressure vessel of embodiment 25, wherein the pressure external to the pressure vessel is produced by either an external ambient pressure, or by an external die.

27. An incrementally autofrettaged metal pipe, comprising: a metal pipe with an initial yield strength; wherein the metal pipe has two or more regions of autofrettaged yield strength, each of which regions corresponds to a cycle of incremental autofrettage; wherein the autofrettaged yield strength of at least one of the regions is increased over the initial yield strength by a percentage selected from a group of percentages consisting of: ≥10%, ≥20%, ≥30%, ≥40%, and ≥50%.

28. The incrementally autofrettaged metal pipe of embodiment 27, wherein at least one cycle of incremental autofrettage is produced by a pressure external to the metal pipe.

29. The incrementally autofrettaged metal pipe of embodiment 28, wherein the pressure external to the metal pipe is produced by either an external ambient pressure, or by an external die.

30. A method of incrementally autofrettaging metal pipe, comprising: providing a metal pipe having an initial yield strength; and applying two or more cycles of incremental autofrettage to the metal pipe; wherein the metal pipe has two or more regions of autofrettaged yield strength, each of which regions corresponds to a cycle of incremental autofrettage; wherein the autofrettaged yield strength of at least one of the regions is increased over the initial yield strength by a percentage selected from a group of percentages consisting of: ≥10%, ≥20%, ≥30%, ≥40%, and ≥50%.

31. The method of incrementally autofrettaging metal pipe of embodiment 30, further comprising providing at least one of the cycles of incremental autofrettage by applying a pressure internal to the metal pipe.

32. The method of incrementally autofrettaging metal pipe of embodiment 31, wherein the pressure internal to the metal pipe is produced by either an internal ambient pressure, or by an internal die.

33. The method of incrementally autofrettaging metal pipe of embodiment 30, further comprising providing at least one of the cycles of incremental autofrettage by applying a pressure external to the metal pipe.

34. The method of incrementally autofrettaging metal pipe of embodiment 33, wherein the pressure external to the metal pipe is produced by either an external ambient pressure, or by an external die.

35. An incrementally autofrettaged pipe produced by a process of incrementally autofrettaging metal pipe, comprising: extruding a metal pipe, the metal pipe possessing an initial yield strength; and applying two or more cycles of incremental autofrettage to the metal pipe to produce an autofrettaged yield strength; whereby the autofrettaged yield strength is increased over the initial yield strength by a percentage selected from a group of percentages consisting of: $\geq 10\%$, $\geq 20\%$, $\geq 30\%$, $\geq 40\%$, and $\geq 50\%$.

36. The incrementally autofrettaged pipe of embodiment 35, wherein the applying of the two or more cycles of incremental autofrettage occur substantially contemporaneously with the extruding of the metal pipe.

37. The incrementally autofrettaged pipe of embodiment 35, wherein the applying of the two or more cycles of incremental autofrettage occur substantially after the extruding of the metal pipe.

38. The incrementally autofrettaged pipe of embodiment 35, wherein at least one of the cycles of incremental autofrettage occurs due to a relative passage of the metal pipe and a die.

39. The incrementally autofrettaged pipe of embodiment 38, wherein the die is selected from a group of dies consisting of: a die internal to the metal pipe, and a die external to the metal pipe.

Although the description herein contains many details, these should not be construed as limiting the scope of the invention, but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Pressure Cycle Points of FIG. 3

0 Virgin Tank (0 psig, Room Temperature)
1 Proof/Autofrettage (1.35xMEOP = 278.1 bar (4034 psig))
2 Post Proof/Autofrettage (0 psig, Room Temperature)
3 $1^{st}$ Cycle Pressurization to 206 bar (2988 psig)
4 $1^{st}$ Cycle Depressurization (0 psig)
5 $2^{nd}$ Cycle Pressurization to 206 bar (2988 psig)

TABLE 1-continued

Pressure Cycle Points of FIG. 3

6 $2^{nd}$ Cycle Depressurization (0 psig)
7 $3^{rd}$ Cycle Pressurization to 206 bar (2988 psig)
8 $3^{rd}$ Cycle Depressurization (0 psig)

TABLE 2

Incremental Autofrettage Cycle Points of FIG. 5A and FIG. 5B

0 Virgin Tank (0 psig, Room Temperature)
1 $1^{st}$ Cycle Pressurization to 40% MEOP (2400 psig)
2 $1^{st}$ Cycle Depressurization (0 psig)
3 $2^{nd}$ Cycle Pressurization to 60% MEOP (3600 psig)
4 $2^{nd}$ Cycle Depressurization (0 psig)
5 $3^{rd}$ Cycle Pressurization to 80% MEOP (4800 psig)
6 $3^{rd}$ Cycle Depressurization (0 psig)
7 $4^{th}$ Cycle Pressurization to 100% MEOP (6000 psig)
8 $4^{th}$ Cycle Depressurization (0 psig)
9 $5^{th}$ Cycle Pressurization to 120% MEOP (7200 psig)
10 $5^{th}$ Cycle Depressurization (0 psig)
11 $6^{th}$ Cycle Pressurization to 150% MEOP (9000 psig)
12 $6^{th}$ Cycle Depressurization (0 psig)
13 $1^{st}$ Operational Cycle Pressurization to 100% MEOP (6000 psig)
14 $1^{st}$ Operational Cycle Depressurization (0 psig)

TABLE 3

Pressure Cycle Points of Prior Art in FIG. 6A and FIG. 6B

0 Virgin Tank (0 psig, Room Temperature)
1 Autofrettage Cycle Pressurization to 150% MEOP (9000 psig)
2 Autofrettage Cycle Depressurization (0 psig)
3 $1^{st}$ Operational Cycle Pressurization to 100% MEOP (6000 psig)
4 $1^{st}$ Operational Cycle Depressurization (0 psig)

What is claimed is:

1. An incrementally autofrettaged composite pressure vessel, comprising:
   a metal liner disposed about an interior volume; and
   a material that substantially contacts and is disposed about the metal liner;
   wherein the metal liner has been subjected to two or more cycles of incremental autofrettage;
   wherein the metal liner comprises two or more regions of autofrettaged yield strength when compared with the metal liner with an initial yield strength prior to any incremental autofrettage; and
   wherein a cycle life of the metal liner is increased over the same metal liner having had zero or one cycles of autofrettage when the interior volume is pressurized to a Maximum Expected Operating Pressure (MEOP), thereby producing one cycle of cycle life for the metal liner;
   whereby the autofrettaged yield strength is increased over the initial yield strength by a percentage selected from a group of percentages consisting of: $\geq 10\%$, $\geq 20\%$, $\geq 30\%$, $\geq 40\%$, and $\geq 50\%$; and
   whereby the increase in the number of cycles in the cycle life for the metal liner at the MEOP is selected from a group of factors consisting of: $\geq 2\times$, $\geq 5\times$, $\geq 10\times$, $\geq 20\times$, $\geq 50\times$, $\geq 100\times$, $\geq 200\times$, $\geq 500\times$, and $\geq 800\times$.

2. The incrementally autofrettaged composite pressure vessel of claim 1:
   wherein the metal liner comprises a pipe.

* * * * *